US012725529B2

(12) United States Patent
Olney et al.

(10) Patent No.: US 12,725,529 B2
(45) Date of Patent: Sep. 1, 2026

(54) AUTOMATED RUNWAY INCURSION ALERT

(71) Applicant: The Boeing Company, Arlington, VA (US)

(72) Inventors: Lance Olney, Arlington, MA (US); David Henriksen, Fort Collins, CO (US); Richard Nagle, Litchfield, ME (US); Cole Newton Crawford, Austin, TX (US)

(73) Assignee: The Boeing Company, Arlington, VA (US)

( * ) Notice: Subject to any disclaimer, the term of this patent is extended or adjusted under 35 U.S.C. 154(b) by 105 days.

(21) Appl. No.: 18/525,619

(22) Filed: Nov. 30, 2023

(65) Prior Publication Data

US 2025/0182635 A1 Jun. 5, 2025

(51) Int. Cl.

*G08G 5/80* (2025.01)
*G08G 5/21* (2025.01)
*G08G 5/54* (2025.01)
*G08G 5/72* (2025.01)

(52) U.S. Cl.

CPC ................. *G08G 5/80* (2025.01); *G08G 5/21* (2025.01); *G08G 5/54* (2025.01); *G08G 5/723* (2025.01)

(58) Field of Classification Search

CPC .. G08G 5/80; G08G 5/21; G08G 5/54; G08G 5/723; G08G 5/22; G08G 5/25; G08G 5/26; G08G 5/52; G08G 5/55; G08G 5/56; G08G 5/727; G08G 5/51

See application file for complete search history.

(56) References Cited

U.S. PATENT DOCUMENTS

| | | | | |
|---|---|---|---|---|
| 8,019,529 B1 * | 9/2011 | Sharma | .................... | G08G 5/51 701/117 |
| 2003/0009278 A1 * | 1/2003 | Mallet | ...................... | G08G 5/22 342/36 |
| 2011/0121998 A1 | 5/2011 | Glover | | |

(Continued)

FOREIGN PATENT DOCUMENTS

EP 3852085 A1 7/2021

OTHER PUBLICATIONS

European Patent Office, Extended European Search Report Issued in Application No. 24216186.7, Jul. 18, 2025, Germany, 9 pages.

(Continued)

*Primary Examiner* — Stephanie T Su

(74) *Attorney, Agent, or Firm* — Alleman Hall LLP

(57) ABSTRACT

A method for providing an automated runway incursion alert comprises receiving, from a location sensor on board an aircraft, location sensor data for the aircraft. Location data is also received for target traffic. Based on the location sensor data for the aircraft, a location, a speed, and a direction of travel are determined for the aircraft. A location, a speed, and a direction of travel are determined for the target traffic based on the location data for the target traffic. The method further comprises determining that the aircraft meets one or more ownship alert criteria and determining that the target traffic meets one or more target traffic alert criteria. Based on determining that the aircraft meets the one or more ownship alert criteria and the target traffic meets the one or more target traffic alert criteria, a runway incursion alert is output.

20 Claims, 9 Drawing Sheets

(56) References Cited

U.S. PATENT DOCUMENTS

| | | | |
|---|---|---|---|
| 2014/0297169 | A1 | 10/2014 | Le et al. |
| 2016/0247406 | A1* | 8/2016 | Khatwa ................ G05D 1/0083 |
| 2018/0233052 | A1 | 8/2018 | Shamasundar et al. |
| 2018/0277116 | A1* | 9/2018 | Shamasundar ........ B64D 43/00 |
| 2020/0273357 | A1 | 8/2020 | Chartier et al. |
| 2021/0241637 | A1* | 8/2021 | Panchangam .......... B64D 45/00 |
| 2021/0280075 | A1 | 9/2021 | Maji et al. |
| 2023/0038694 | A1 | 2/2023 | Foo et al. |
| 2023/0093956 | A1 | 3/2023 | S et al. |
| 2025/0182630 | A1 | 6/2025 | Olney et al. |

OTHER PUBLICATIONS

European Patent Office, Extended European Search Report Issued in Application No. 24212892.4, Apr. 7, 2025, Germany, 10 pages.

* cited by examiner

AUTOMATED RUNWAY INCURSION ALERT

BACKGROUND

Air traffic controllers, ground controllers, pilots, and airport ground vehicle operators monitor movements of aircraft and ground vehicles to ensure safe and efficient aviation operations. Traffic monitoring can include visual tracking, as well as radar or satellite-based systems to monitor the aircraft and ground vehicles. In this manner, air traffic controllers, ground controllers, pilots, and vehicle operators can coordinate movements of the aircraft and ground vehicles to avoid conflicts during airport operations.

SUMMARY

According to one aspect of the present disclosure, a method is provided for providing an automated runway incursion alert. The method comprises receiving, from a location sensor on board an aircraft, location sensor data for the aircraft. Location data is also received for target traffic. Based on the location sensor data for the aircraft, a location, a speed, and a direction of travel are determined for the aircraft. A location, a speed, and a direction of travel are determined for the target traffic based on the location data for the target traffic. The method further comprises determining that the aircraft meets one or more ownship alert criteria and determining that the target traffic meets one or more target traffic alert criteria. Based on determining that the aircraft meets the one or more ownship alert criteria and the target traffic meets the one or more target traffic alert criteria, a runway incursion alert is output.

This simplified summary of the specification is presented to provide a basic understanding of some aspects of the specification. This summary is not an extensive overview of the specification. It is intended to neither identify key or critical elements of the specification nor delineate any particular embodiments of the specification, or any scope of the claims. Its sole purpose is to present some concepts of the specification in a simplified form as a prelude to the more detailed description that is presented in this disclosure.

DETAILED DESCRIPTION

As introduced above, air traffic controllers, ground controllers, pilots, and other vehicle operators can coordinate movements of the aircraft and ground vehicles to avoid conflicts during airport operations. However, in some instances, an aircraft or a ground vehicle can unexpectedly or erroneously enter a runway. For example, a pilot can inadvertently enter an active runway without clearance, or the pilot may be given clearance to use the runway by mistake. This is generally referred to as a runway incursion. Runway incursions represent a serious safety risk, as they can lead to collisions.

Radar can be used by air traffic control and ground control to monitor locations of aircraft on the ground and/or in the air to prevent runway incursions. However, radar can have blind spots. It can also be challenging to use radar to track aircraft or vehicles on the ground.

Visual observation is another technique that can prevent runway incursions and avoid collisions. Runway markers and lighting patterns also distinguish different areas of an airport (e.g., runways and taxiways) and vehicles. However, visual observation can be difficult in adverse weather and other low-visibility conditions. Furthermore, verbal reporting and communication of traffic positions can be less reliable than an automated alerting system. For example, miscommunication can potentially lead to hazardous situations. Furthermore, delayed instructions may not provide sufficiently advanced notice for an aircraft to initiate a go-around or clear a runway.

To address the above issues, examples are disclosed that relate to providing an automated runway incursion alert. Briefly, location sensor data for an aircraft is received from a location sensor on board the aircraft. Location data is also received for target traffic. A location, a speed, and a direction of travel are determined for the aircraft and the target traffic based upon the location sensor data for the aircraft and the location data for the target traffic. A runway incursion alert is output based on determining that the aircraft meets one or more ownship alert criteria and the target traffic meets one or more target traffic alert criteria. Alerting pilots about the location and movements of other aircraft and ground vehicles on the runway allows pilots to take precautions to ensure the safety of their passengers and equipment. This system has the potential to greatly reduce the risk of runway incursions, for example at busy airports that deal with a high volume of traffic, or when instrument meteorological conditions prevent visual identification of the runway on approach. This can help to prevent a collision or abrupt flight deviation.

Figure 1:
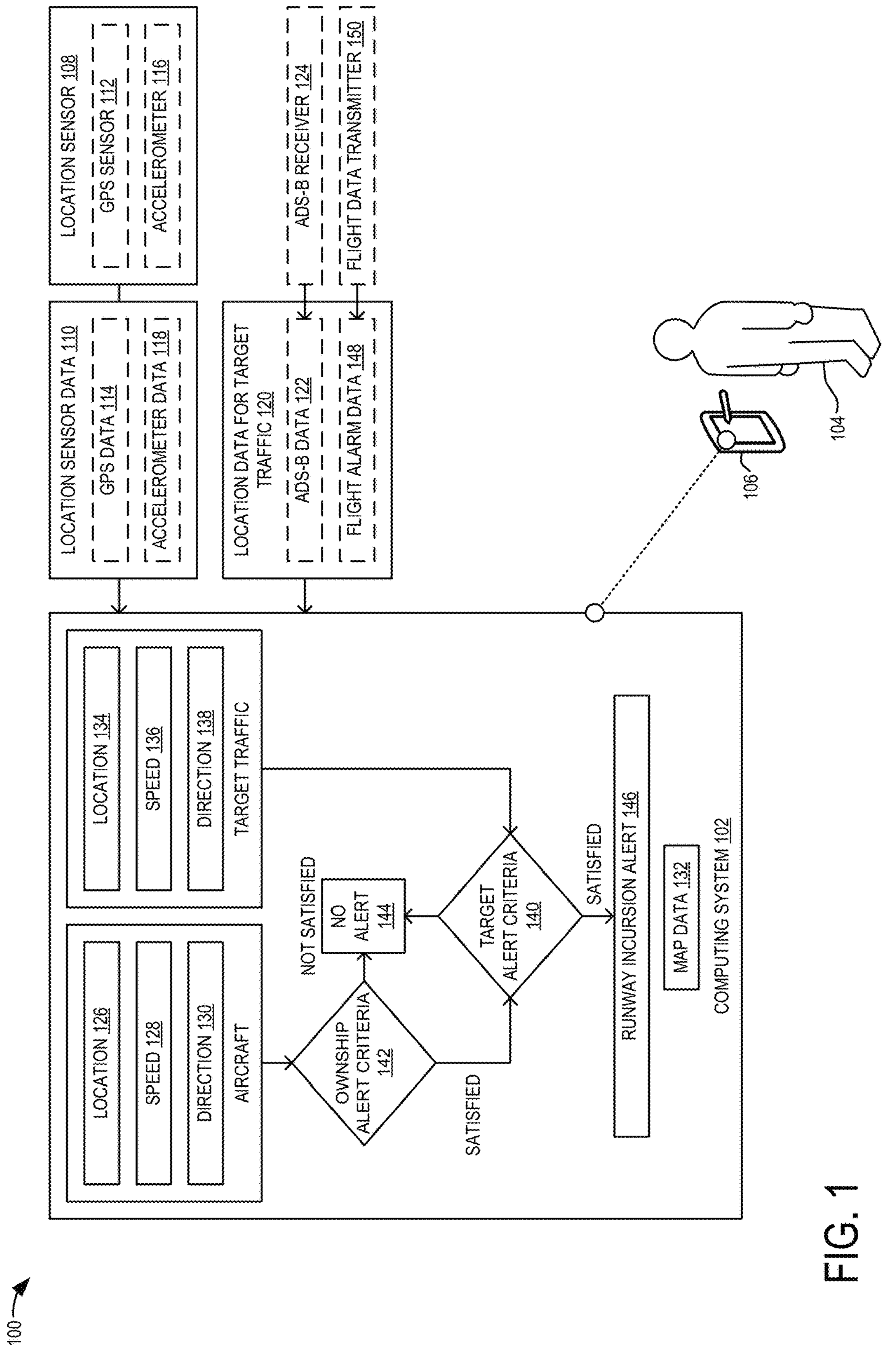
FIG. 1 shows a block diagram of an example system for providing an automated runway incursion alert.

FIG. 1 shows an example of a system 100 for providing an automated runway incursion alert. The system 100 includes a computing system 102. The computing system 102 comprises a processor and a memory storing instructions executable by the processor. The instructions are executable to implement the methods and processes described herein. Additional aspects of the computing system 102 are described in more detail below with reference to FIG. 8.

Figure 2:
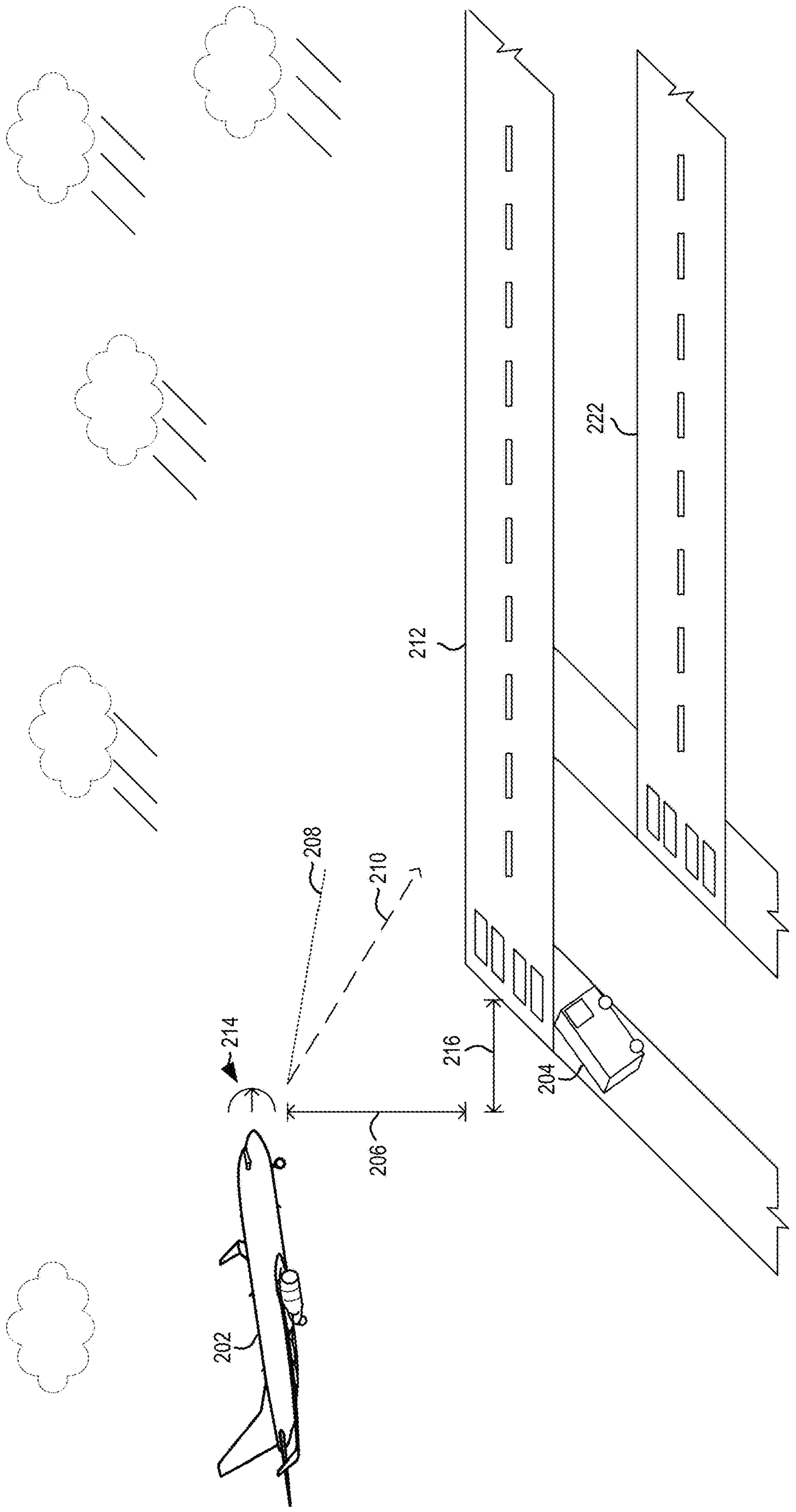
FIG. 2 shows a schematic example of an operating environment including an aircraft and a ground vehicle.

In some examples, the computing system 102 comprises a tablet computing device, a laptop computing device, a mobile computing device (e.g., a smartphone), or a wearable computing device (e.g., a smartwatch) that is operated by an end user 104 (e.g., an aircraft pilot or another vehicle operator). For example, at least a portion of the computing system 102 can be implemented at a tablet computing device 106 operated by the end user 104. In other examples, the computing system 102 comprises a server computing device. For example, aspects of the methods and processes described herein can be implemented at a server computing device executing a web application that is operated by the end user 104 through a user computing device such as tablet computing device 106. In this manner, at least a portion of the computing system 102 can be implemented on board an aircraft. For example, FIG. 2 shows an example of an aircraft 202 in which a computing device, such as the computing system 102 of FIG. 1, can be located.

As introduced above, the computing system 102 can take the form of a user computing device, such as the tablet computing device 106 of FIG. 1, rather than a computing system integrated with an aircraft's avionics equipment. By providing the computing system separately from the avionics, the computing system may output notifications to an aircraft operator other than those generally included in integrated avionics according to aeronautical regulations (e.g., Federal Aviation Administration regulations and notices). It will also be appreciated that, where permissible, one or more aspects of the computing system can be integrated into an aircraft and/or a ground vehicle (e.g., as part of a glass cockpit system or other avionics equipment).

Referring again to FIG. 1, the computing system 102 is configured to receive, from a location sensor 108 on board an aircraft, location sensor data 110 for the aircraft. FIG. 2 shows an example of an aircraft 202 in which a computing system, such as the computing system 102 of FIG. 1, can be located. In some examples, the location sensor data 110 are obtained from a sensor coupled to the aircraft. For example, a tablet computing device on board the aircraft can obtain the location sensor data from a location sensor integrated with the aircraft 202. In other examples, the tablet computing device can include one or more integrated location sensors configured to provide location sensor data for the tablet computing device. When the tablet computing device is on-board the aircraft, such location sensor data can be substituted for, or augment, data obtained from aircraft systems.

In some examples, the location sensor 108 comprises a GPS sensor 112 and the location sensor data 110 comprises GPS data 114 from the GPS sensor 112. The location sensor can additionally or alternatively comprise an accelerometer 116 (e.g., as one or more components of an inertial measurement unit or IMU). The location sensor data 110 can comprise accelerometer data 118 from the accelerometer 116.

Referring again to FIG. 1, the computing system 102 is configured to receive location data 120 for target traffic. FIG. 2 shows an example of target traffic in the form of a ground vehicle 204. It will also be appreciated that the target traffic can comprise any other suitable type of traffic, such as another aircraft. In some examples, the location data 120 for the target traffic comprises automatic dependent surveillance-broadcast (ADS-B) data 122 received from an ADS-B receiver 124 communicatively coupled with the computing system 102. In some examples, the ADS-B receiver 124 is integrated with the aircraft (e.g., as an antenna located on an exterior surface of a fuselage of the aircraft). In other examples, the ADS-B receiver 124 is a peripheral ADS-B receiver device that can be coupled to a computing system, such as the tablet computing device 106 of FIG. 1. The ADS-B receiver 124 is configured to receive an altitude and position of the target traffic according to ADS-B Out equipment performance standards (e.g., 14 CFR 91.227).

In other examples, the location data 120 for the target traffic comprises flight alarm data 148 received from the target traffic. For example, the target traffic can include a flight data transmitter 150. The flight data transmitter 150 is configured to transmit the location data 120 from the target traffic to the computing system 102. For example, the flight data transmitter 150 can transmit GPS data, barometric pressure data, etc., which can alert the computing system 100 and other traffic in the vicinity of the target traffic if the target traffic represents a potential conflict.

The computing system 102 is configured to determine a location 126, a speed 128 (e.g., a ground speed or an air speed), and a direction of travel 130 for the aircraft based on the location sensor data 110 for the aircraft. In some examples, the location 126, the speed 128, and the direction of travel 130 are output to an operator of the aircraft. For example, the location 126, the speed 128, and the direction of travel 130 can be output for display to the end user 104.

Figure 3:
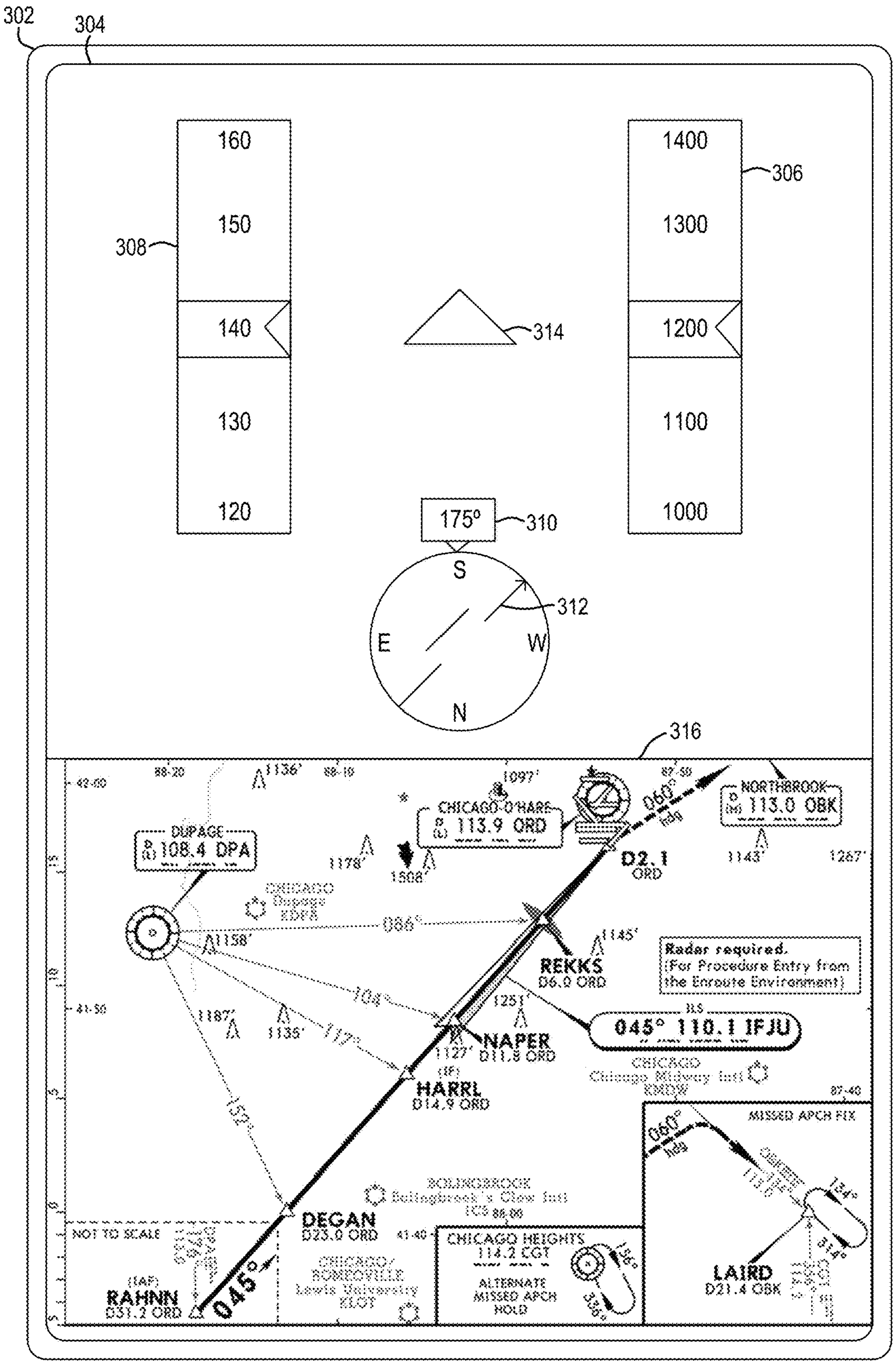
FIG. 3 schematically illustrates an example of a tablet computing device with a graphical user interface (GUI) that can be used by an aircraft operator.

FIG. 3 shows an example of a tablet computing device 302 that can be used by an aircraft operator. The tablet computing device 302 comprises a display 304 configured to display a plurality of graphical user interface (GUI) elements. The GUI elements include an altimeter 306, an airspeed indicator 308, a heading indicator 310, and a course deviation indicator 312. These elements are arranged around a simulated attitude indicator 314 for an aircraft.

In some examples, the computing system 102 of FIG. 1 comprises map data 132. The map data 132 can additionally or alternatively be output for display to the end user 104 via the tablet computing device 106. In the example of FIG. 3, map data 316 is displayed on the tablet computing device 302 in the form of an instrument approach procedure plate. In other examples, any other suitable map data can be provided. Other examples of suitable map data include an airport ground diagram, a sectional chart, a helicopter chart, an enroute chart, and a departure procedure plate.

Referring again to FIG. 1, the computing system 102 is also configured to determine a location 134, a speed 136, and a direction of travel 138 for the target traffic based on the location data 120 for the target traffic. However, information about the target traffic may not be output without determining that the location 134, the speed 136, and the direction of travel 138 of the target traffic satisfies one or more target traffic alert criteria 140 and that the location 126, the speed 128, and the direction of travel 130 satisfies one or more ownship alert criteria 142. Suppression of outputs regarding the target traffic can prevent distracting aircraft operators and/or other vehicle operators.

The following paragraphs describe examples of ownship alert criteria 142. In some examples, the one or more ownship alert criteria 142 include an identification of an ownship. The term "ownship" generally represents one's own aircraft. For example, the ownship can comprise an aircraft operated by the end user 104, or an aircraft at which the computing system 102 is located, accessed, or operated. In some examples, an explicit identity of the ownship is provided to the computing system 102. In other examples, the computing system 102 is configured to determine the identity of the ownship based upon the location sensor data 110 and the location data 120 for the target traffic. A determination that the target traffic corresponds to the ownship suppresses output of a runway incursion alert, as indicated at 144. This prevents the computing system 102 from outputting an irrelevant alert. On the other hand, determining that the target traffic does not correspond to the ownship enables output of the runway incursion alert, as indicated at 146.

In some examples, the one or more ownship alert criteria 142 additionally or alternatively include determining that the aircraft is at or within a predetermined altitude range. FIG. 2 shows an example of a predetermined altitude range 206 with respect to the aircraft 202. In some examples, the predetermined altitude range 206 comprises an altitude range of 100-5000 feet above ground level (AGL). In some more specific examples, the predetermined altitude range 206 comprises an altitude range of 200-1000 feet AGL. In further, more specific examples, the predetermined altitude range 206 comprises an altitude range of 300-1000 feet AGL. It will also be appreciated that any other suitable altitude range can be used. In some examples, a lower bound of the predetermined altitude range can be selected such that the aircraft has sufficient time to respond to potential traffic on the runway. For example, below 300 feet, it may not be desirable to provide potentially distracting alerts. Furthermore, the aircraft may be within visual range of the runway. An upper bound of the predetermined altitude range can be selected to prevent prematurely alerting pilot(s)

Additionally or alternatively, in some examples, the one or more ownship alert criteria 142 include determining that the aircraft is descending at or within a threshold descent rate. FIG. 2 shows a threshold descent rate 208 for the aircraft 202. The threshold descent rate can be selected to reflect a shallower rate of descent than a glide path for a selected approach. In some examples, the threshold descent rate is 100 or more feet per minute (FPM). In some more specific examples, the threshold descent rate is 200 or more FPM. In further, more specific examples, the threshold descent rate is 300 or more FPM. In this manner, the threshold descent rate can prevent the computing system from alerting the pilot(s) if the aircraft is not committed to landing. For example, FIG. 2 also shows a schematic example of a glide path 210 for the aircraft 202, which is below a theoretical glide path at or above the threshold descent rate 208. In other examples, the threshold descent rate can be equal to or steeper than the glide path for the approach. This can allow for a broader range of circumstances in which the runway incursion alert can be output.

In some examples, the one or more ownship alert criteria 142 additionally or alternatively include determining that the map data 132 includes the following criteria for a runway the aircraft is approaching: a base latitude, a base longitude, a base heading (e.g., as a true heading), a reciprocal latitude for the opposite runway threshold, a reciprocal latitude for the opposite runway threshold, and a reciprocal heading (e.g., the heading of the opposite runway).

Additionally or alternatively, in some examples, the one or more ownship alert criteria 142 include determining that the aircraft is at or within a threshold heading of a runway direction. The runway direction can be determined based upon the map data 132. For example, FIG. 2 shows the aircraft 202 approaching a runway 212. The aircraft 202 has a heading 214. The heading 214 is within a threshold heading of the runway 212. In some examples, the threshold heading comprises a heading in a range of 45 degrees or less. In some more specific examples, the threshold heading is in a range of 25 degrees or less. In further, more specific examples, the threshold heading is in a range of 15 degrees or less. In this manner, the threshold heading can prevent the computing system from alerting the pilot(s) if the aircraft is not traveling in a general direction of the runway (e.g., when the aircraft is on a crosswind leg of an approach).

In some examples, the one or more ownship alert criteria 142 additionally or alternatively include determining that the aircraft is at or within a threshold distance to a runway threshold. FIG. 2 shows an example of a threshold distance 216 with respect to the aircraft 202 and the runway 212. In some examples, the threshold distance 216 is a direct distance metric. For example, the threshold distance 216 can be a distance in a range of 0-5 nm. In some more specific examples, the threshold distance 216 is in a range of 1-4 nm. In further, more specific examples, the threshold distance 216 is in a range of 2-3 nm. In other examples, the threshold distance is a function of a speed of the aircraft 202. For example, the threshold distance 216 can be a distance in which the aircraft 202 travels in a range of 0-5 minutes. In some more specific examples, the threshold distance 216 comprises a distance in which the aircraft 202 travels in a range of 1-3 minutes. In further, more specific examples, the threshold distance 216 comprises a distance in which the aircraft 202 travels in a range of 1-2 minutes. The threshold distance can be selected to prevent prematurely alerting the pilot(s).

Figure 4:
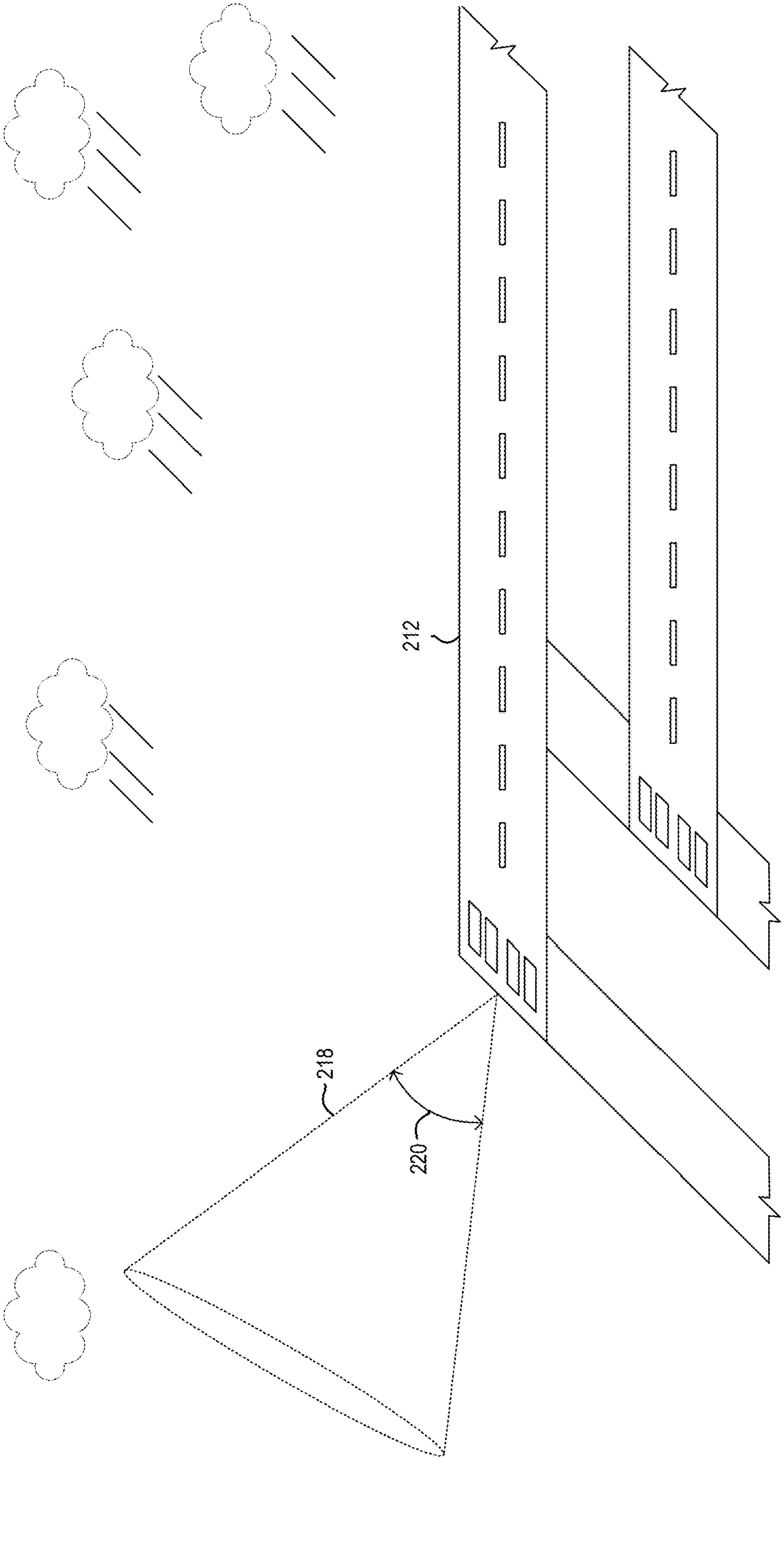
FIG. 4 shows a schematic example of another operating environment including a final approach envelope for a runway.

Additionally or alternatively, in some examples, the one or more ownship alert criteria 142 include determining that the aircraft is within a final approach envelope extending from the runway threshold. In some examples, the final approach envelope comprises an envelope formed by a cone having an angle in a range of 0-10 degrees extending from the runway threshold. For example, FIG. 4 shows an example of a final approach envelope 218 extending from a threshold of the runway 212. The final approach envelope 218 comprises a cone having an angle 220. In some more specific examples, the angle is in a range of 1-5 degrees. In further, more specific examples, the angle is in a range of 2-4 degrees. The final approach envelope allows the computing system to identify whether an aircraft is on a final approach to the runway.

In some examples, the one or more ownship alert criteria 142 of FIG. 1 additionally or alternatively include determining that the aircraft does not qualify for more than one runway. For example, and with reference again to FIG. 3, a runway incursion alert will not be output if the aircraft 202 satisfies the one or more ownship alert criteria for the runway 212 and a second runway 222. In this manner, the ownship alert criteria prevent the computing system from outputting an inaccurate alert if it cannot reliably discern which runway the aircraft intends to land on.

Referring again to FIG. 1, the computing system is further configured to determine whether the target traffic meets the one or more target traffic alert criteria 140. The following paragraphs describe examples of target traffic alert criteria. In some examples, the one or more target traffic alert criteria 140 include determining that the target traffic is on a runway. For example, and with reference now to FIG. 5, to determine if a second aircraft 224 is on the runway 212, a linestring rectangle 226 can be created using the latitude and longitude of each end of the runway 212, as well as a published width of the runway 212. In cases where width is not present for a runway, a default width value can be used. In some examples, the default width comprises a width in a range of 10-200 feet. In some more specific examples, the default width comprises a width in a range of 25-100 feet. In further, more specific examples, the default width comprises a width in a range of 50-75 feet. These boundaries help the computing system differentiate whether a vehicle is on the runway or adjacent to the runway (e.g., holding short of the runway or exiting the runway).

Parallel runways (e.g., runways 212 and 222 of FIG. 2) can have centerlines that are close enough together to make it challenging to distinguish each runway before an aircraft is on short final. To prevent alerting pilots of aircraft on one or more adjacent runways, the output of the runway incursion alert can be inhibited for parallel runways in which a distance between a centerline of each runway is less than a threshold distance. In some examples, the threshold distance comprises a distance in a range of 0-2500 feet. In some more specific examples, the threshold distance comprises a distance in a range of 0-1000 feet. In further, more specific examples, the threshold distance comprises a distance in a range of 0-850 feet.

In some examples, the one or more target traffic alert criteria 140 additionally or alternatively include determining that the location data 120 for the target traffic is not sourced from the internet. Internet traffic information can be delayed (e.g., due to network latency), which can result in inaccurate runway incursion alerts. For example, the internet traffic information can indicate that an aircraft is on the runway when it has already departed in the real world. In contrast, the use of location data that is closer to real time can provide a more accurate picture of traffic conditions.

Figure 5:
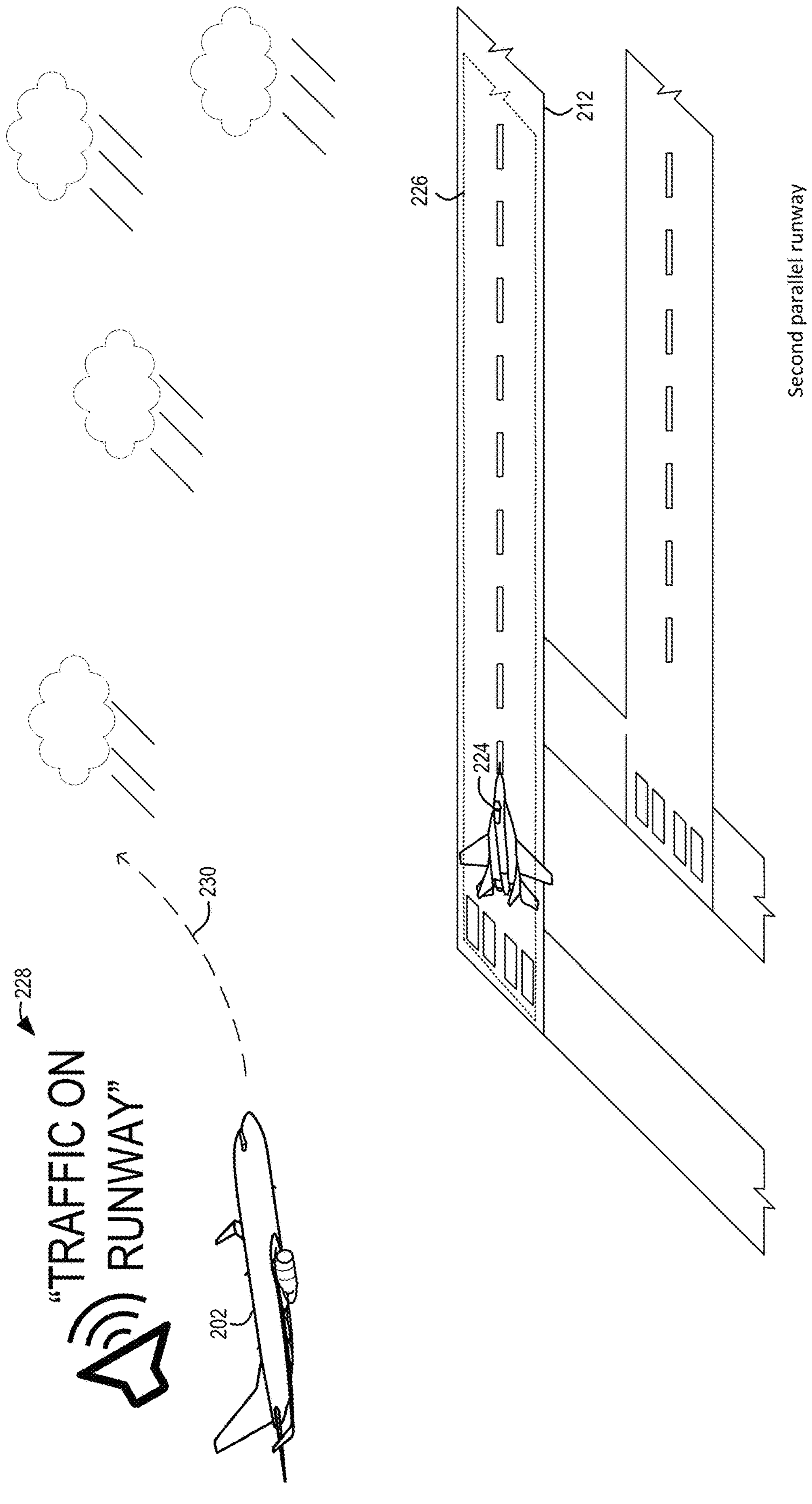
FIG. 5 shows a schematic example of another operating environment.

Additionally or alternatively, in some examples, the one or more target traffic alert criteria 140 include determining that the target traffic is grounded. For example, the ground vehicle 204 of FIG. 2 is on a taxiway adjacent to the runway 212, and the other aircraft 224 of FIG. 5 is grounded on the runway 212. By ensuring that the target traffic is grounded, the computing system may not erroneously report that airborne traffic is on the runway.

In some examples, the one or more target traffic alert criteria 140 additionally or alternatively include determining that the target traffic is not diverging from the aircraft. Divergence can be established based at least upon the target traffic having a greater ground speed than an ownship aircraft, and also having a heading in another direction from the ownship aircraft (e.g., traveling away from the ownship aircraft). Traffic diverging from the ownship aircraft's position may not trigger the runway incursion alert. In contrast, traffic that is not diverging, or that is converging on the ownship aircraft, may trigger the runway incursion alert. For example, the other aircraft 224 of FIG. 5 may not trigger the runway incursion alert if it is taking off in a direction of the runway 212 and has a greater ground speed than the aircraft 202 on final. However, if the other aircraft 224 is not diverging from the aircraft 202, a runway incursion alert 228 can be output to pilots of the aircraft 202. In this manner, the pilots can judge whether the other aircraft 224 is a risk to their approach, and can take respond accordingly. For example, the pilots can communicate with air traffic control and/or initiate a go-around maneuver, as indicated at 230 in FIG. 5.

Figure 6:
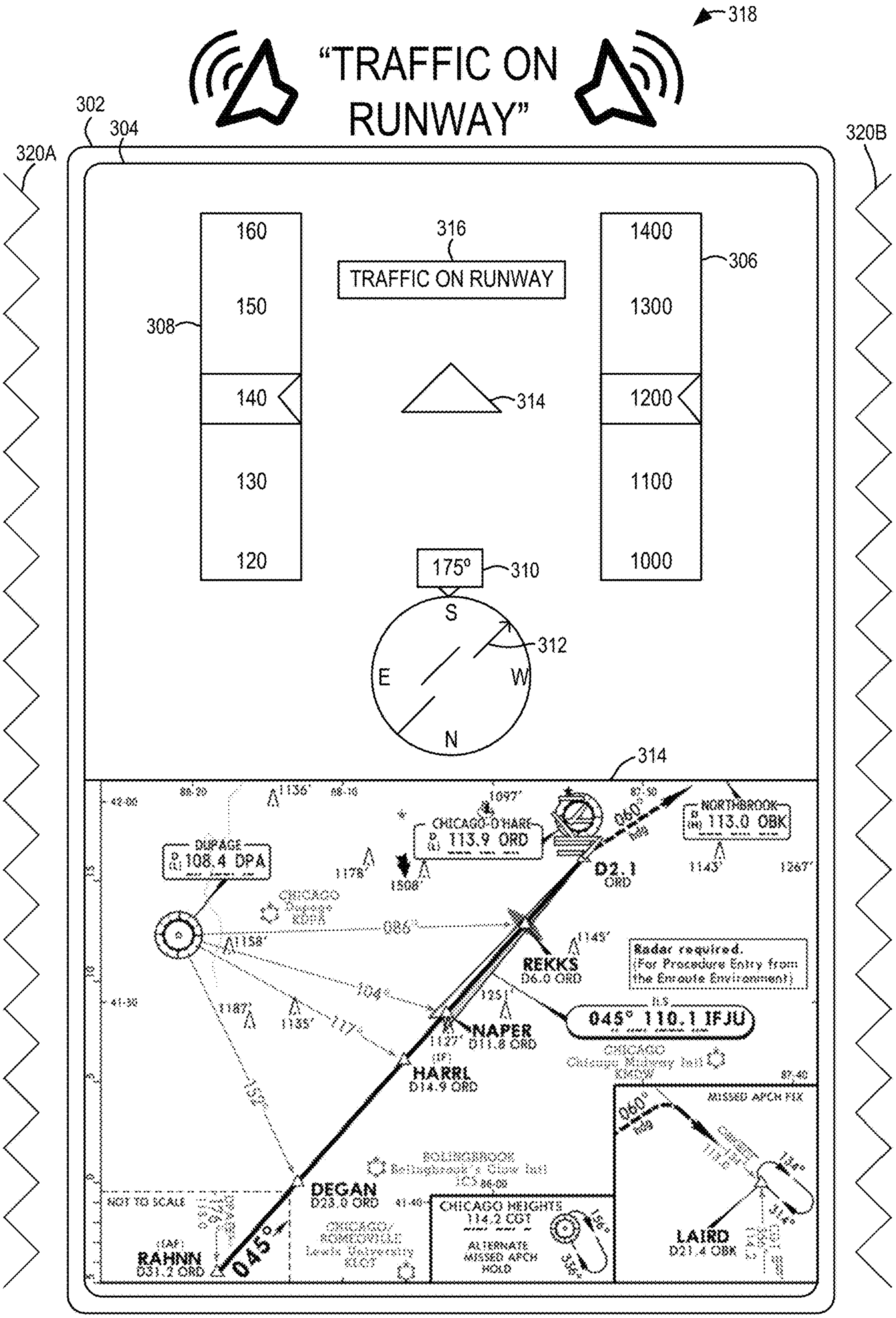
FIG. 6 schematically illustrates the tablet computing device of FIG. 3 configured to output a runway incursion alert.

As introduced above, based upon determining that the aircraft meets the one or more ownship alert criteria 142 and the target traffic meets the one or more target traffic alert criteria 140, the computing system 102 of FIG. 1 is configured to output the runway incursion alert 146. FIG. 6 shows various forms of a runway incursion alert that can be output by the tablet computing device 302 of FIG. 3. In some examples, the runway incursion alert includes a visual notification 318 on the display 304. In the example of FIG. 6, the visual notification 318 takes the form of text "TRAFFIC ON RUNWAY" superimposed over the attitude indicator 314. In other examples, the visual notification 318 can have any other suitable form (e.g., different text or a color change on the display 304). The runway incursion alert can additionally or alternatively include any other suitable information. For example, the runway incursion alert can include the runway number and airport identifier (e.g., KSEA or KPDX).

The runway incursion alert additionally or alternatively includes an audible notification 320. In the example of FIG. 6, the audible notification 320 comprises a verbal output saying "traffic on runway." In other examples, the audible notification 320 can have any other suitable form (e.g., an alarm or other suitable sound).

The runway incursion alert additionally or alternatively includes haptic feedback. For example, the tablet computing device 302 can vibrate, as indicated at 322A and 322B in FIG. 6. The tablet computing device 302 can additionally or alternatively transmit an instruction to cause a wearable computing device, such as a smartwatch worn by a vehicle operator, to vibrate. In this manner, the tablet computing device 302 can alert pilot(s) and/or other vehicle operators of the runway incursion.

In some examples, and with reference again to FIG. 1, the runway incursion alert 146 can be repeated and/or remain active for a threshold time. In some examples, the runway incursion alert 146 can be output once per minute or at any other suitable rate. The runway incursion alert 146 can additionally or alternatively be dismissed by a user (e.g., by tapping the display 304 of the tablet computing device 302 of FIG. 6). In some examples, the runway incursion alert 146 is dismissed when one or more of the ownship alert criteria 142 and/or the target alert criteria 140 are no longer satisfied. For example, the computing system 102 can cease output of the runway incursion alert 146 when the aircraft is outside of the threshold distance to the runway threshold (e.g., the aircraft is departing the vicinity of the runway on a go-around), and/or the target traffic begins to diverge from the aircraft.

Figure 7A:
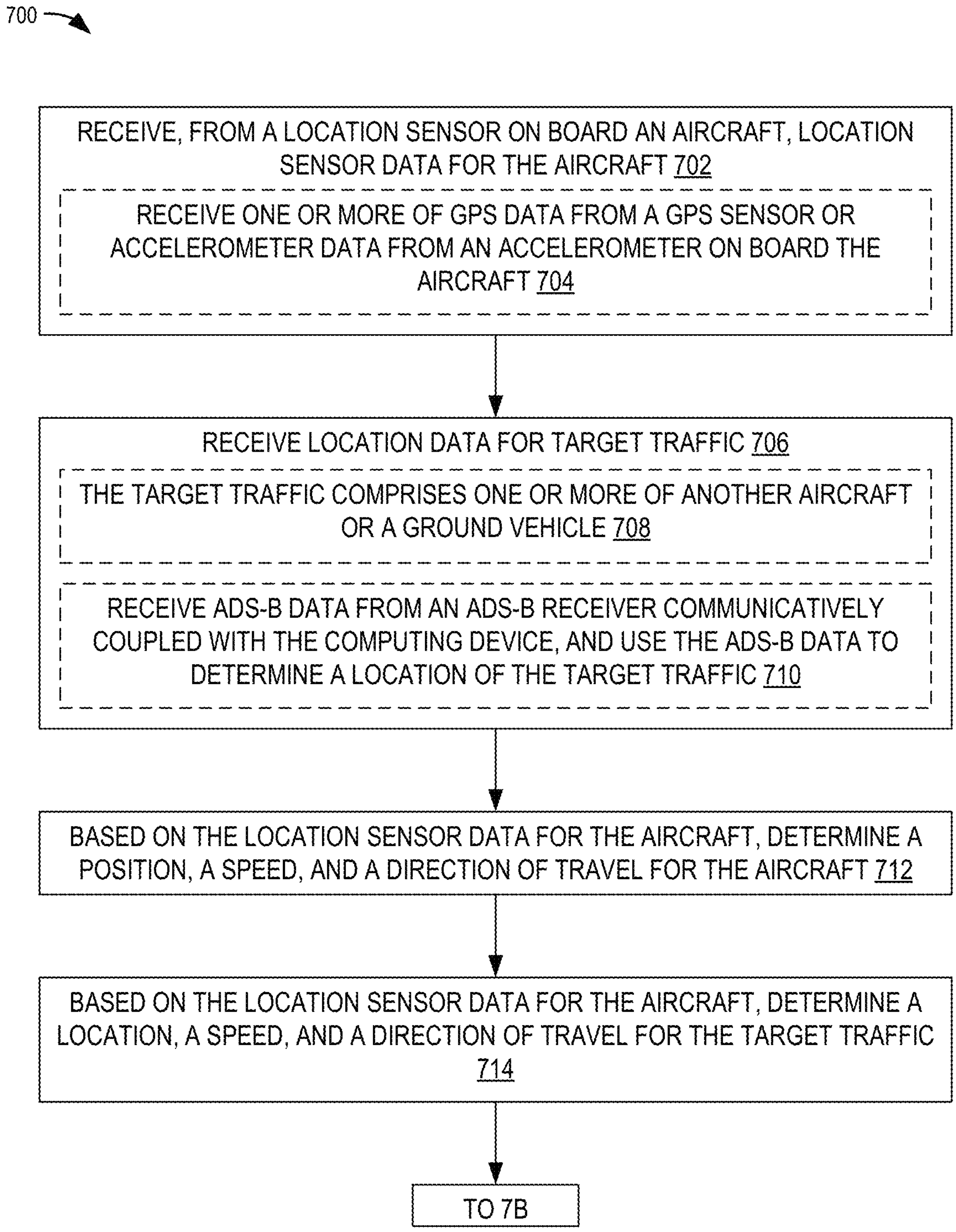
FIGS. 7A-7B show a block diagram of an example method for providing an automated runway incursion alert.
Figure 7B:
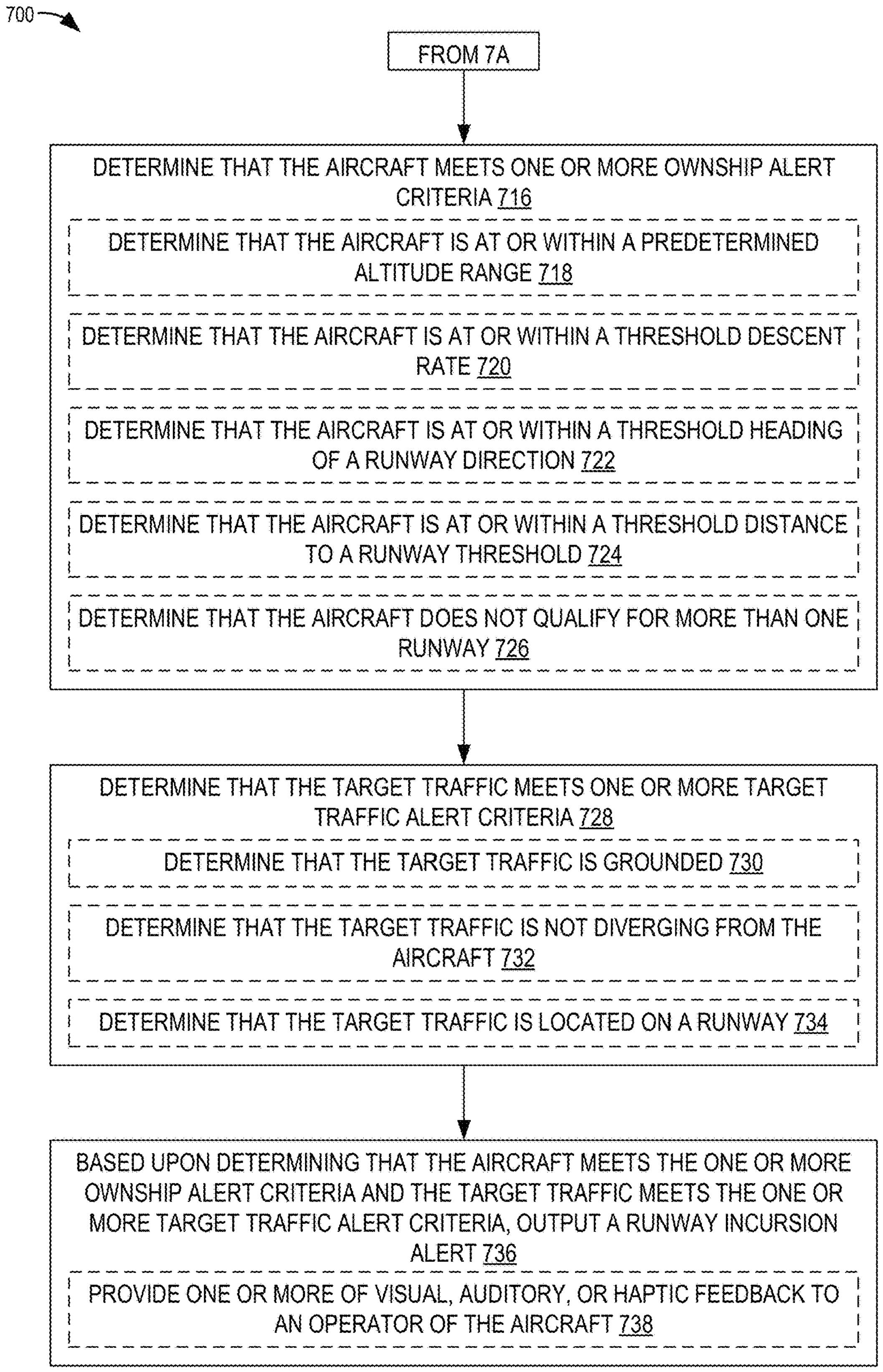

FIGS. 7A-7B show a flow diagram depicting an example method 700 for providing an automated runway incursion alert. The following description of the method 700 is provided with reference to FIGS. 1-6 above and FIG. 8 below. It will be appreciated that the method 700 also can be performed in other contexts.

Referring first to FIG. 7A, at 702, the method 700 comprises receiving, from a location sensor on board an aircraft, location sensor data for the aircraft. In some examples, at 704, receiving the location sensor data for the aircraft comprises receiving one or more of GPS data from a GPS sensor or accelerometer data from an accelerometer on board the aircraft.

At 706, the method 700 comprises receiving location data for target traffic. In some examples, at 708, the target traffic comprises one or more of another aircraft or a ground vehicle. For example, the target traffic can take the form of a ground vehicle, as shown in FIG. 2. In other examples, the target traffic can comprise any other suitable type of traffic, such as the aircraft 224 of FIG. 5.

At 710, in some examples, receiving the location data for the target traffic comprises receiving ADS-B data from an ADS-B receiver communicatively coupled with the computing system, and using the ADS-B data to determine a location of the target traffic. ADS-B can provide location data that is more accurate and timely than location data obtained from other sources, such as the internet.

The method 700 further comprises, at 712, based on the location sensor data for the aircraft, determining a location, a speed, and a direction of travel for the aircraft. At 714, the method 700 further comprises, based on the location data for the target traffic, determining a location, a speed, and a direction of travel for the target traffic. In this manner, the location sensor data for the aircraft and the location data for the target traffic can be used to identify a potential runway incursion.

Referring now to FIG. 7B, the method 700 further comprises, at 716, determining that the aircraft meets one or more ownship alert criteria. Steps 718-726 describe examples of ownship alert criteria.

In some examples, at 718, determining that the aircraft meets the one or more ownship alert criteria comprises determining that the aircraft is at or within a predetermined altitude range. FIG. 2 shows an example of a predetermined altitude range 206 with respect to the aircraft 202. The predetermined altitude range can be selected to ensure that the aircraft has sufficient time to respond to potential traffic on the runway, and to prevent prematurely alerting pilot(s).

At 720, in some examples, determining that the aircraft meets the one or more ownship alert criteria comprises determining that the aircraft is descending at or within a threshold descent rate. FIG. 2 shows an example of a threshold descent rate 208 for the aircraft 202. The threshold descent rate can suppress output of the runway incursion alert if the aircraft is not committed to landing.

In some examples, at 722, determining that the aircraft meets the one or more ownship alert criteria comprises determining that the aircraft is at or within a threshold heading of a runway direction. For example, FIG. 2 shows the aircraft 202 approaching a runway 212 at a heading 214 within a threshold heading of the runway 212. The threshold heading ensures that the aircraft is traveling in the same general direction of the runway before providing a runway incursion alert.

At 724, in some examples, determining that the aircraft meets the one or more ownship alert criteria comprises determining that the aircraft is at or within a threshold distance to a runway threshold. For example, FIG. 2 shows a threshold distance 216 with respect to the aircraft 202 and the runway 212. The threshold distance can be selected to ensure that the aircraft has sufficient time to respond to potential traffic on the runway, while also avoiding providing a premature alert.

In some examples, at 726, determining that the aircraft meets the one or more ownship alert criteria comprises determining that the aircraft does not qualify for more than one runway. For example, a runway incursion alert will not be output if an aircraft satisfies one or more ownship alert criteria for two parallel runways. In this manner, the ownship alert criteria prevent output of an inaccurate alert if it is unclear which runway (if any) the aircraft intends to land on.

The method 700 further comprises, at 728, determining that the target traffic meets one or more target traffic alert criteria. Steps 730-734 describe examples of target traffic alert criteria.

In some examples, at 730, determining that the target traffic meets the one or more target traffic alert criteria comprises determining that the target traffic is grounded. For example, the ground vehicle 204 of FIG. 2 is on a taxiway adjacent to the runway 212, and the other aircraft 224 of FIG. 5 is grounded on the runway 212. This prevents airborne aircraft from erroneously triggering a runway incursion alert.

At 732, in some examples, determining that the target traffic meets the one or more target traffic alert criteria comprises determining that the target traffic is not diverging from the aircraft. For example, the other aircraft 224 of FIG. 5 may not trigger the runway incursion alert if it is taking off in a direction of the runway 212 and has a greater ground speed than the aircraft 202. In this manner, pilots may not be alerted when another vehicle does not pose a risk to their aircraft.

In some examples, at 734, determining that the target traffic meets the one or more target traffic alert criteria comprises determining that the target traffic is located on a runway. For example, the second aircraft 224 of FIG. 5 is on the runway 212, but the ground vehicle 204 of FIG. 2 is not on the runway. Accordingly, the second aircraft 224 could represent a possible runway incursion, but the ground vehicle 204 does not.

At 736, the method 700 further comprises, based upon determining that the aircraft meets the one or more ownship alert criteria and the target traffic meets the one or more target traffic alert criteria, outputting a runway incursion alert. In some examples, at 738, outputting the runway incursion alert comprises providing one or more of visual, auditory, or haptic feedback to an operator of the aircraft. FIG. 6 shows several examples of a runway incursion alert, including a visual notification 318, an audible notification 320, and haptic feedback. In this manner, the tablet computing device can alert pilot(s) and/or other vehicle operators of the runway incursion.

Providing an automated runway incursion alert can allow pilots to respond to possible traffic on a runway. The alerting system provides an additional measure of situational awareness in low-visibility conditions (e.g., adverse weather), and can continuously or periodically scan the aircraft's surroundings for traffic, even at airports without tower control or radar coverage. As described above, the location data is processed with one or more ownship alert criteria and one or more target traffic alert criteria. This enables an accurate alert to be output sufficiently early for the pilots to communicate with the target traffic and/or air traffic control, or to abandon an approach and go around. This supplements human judgment and communication, reducing reliance on human factors and ensuring situational awareness.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
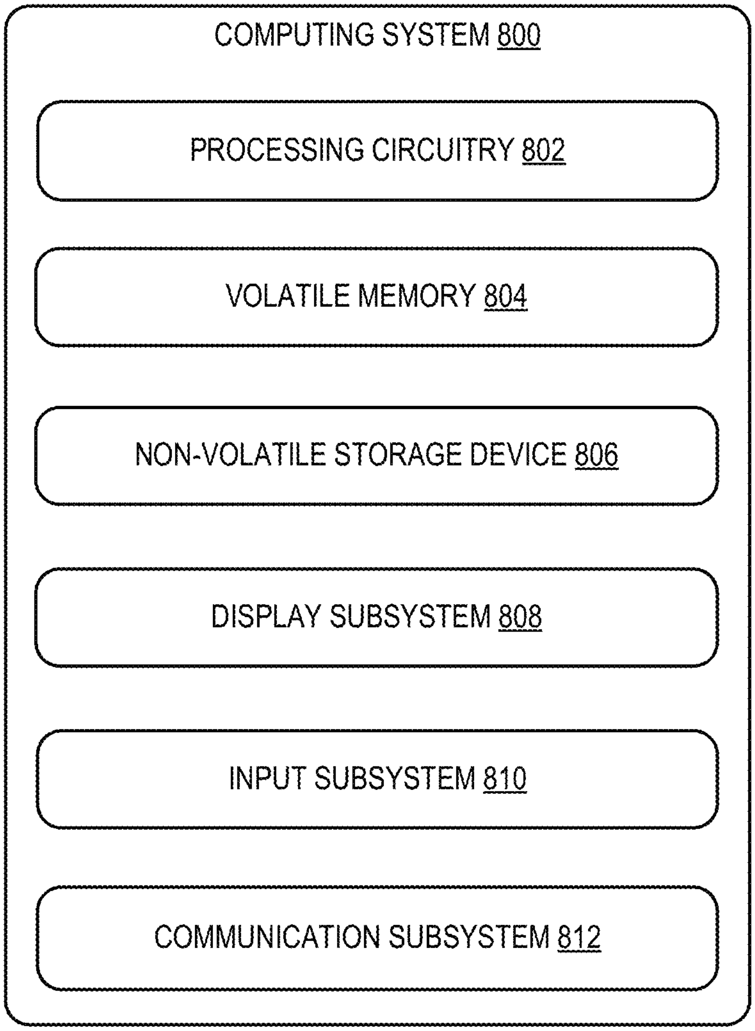
FIG. 8 shows a block diagram of an example computing system.

FIG. 8 schematically shows a non-limiting embodiment of a computing system 800 that can enact one or more of the methods and processes described above. Computing system 800 is shown in simplified form. Computing system 800 may embody the computing system 102 described above and illustrated in FIG. 1. Components of computing system 800 may be included in one or more personal computers, server computers, tablet computers, home-entertainment computers, network computing devices, video game devices, mobile computing devices, mobile communication devices (e.g., smartphone), a flight control computer, a flight management computer, and/or other computing devices, and wearable computing devices such as smart wristwatches and head mounted augmented reality devices.

Computing system 800 includes processing circuitry 802, volatile memory 804, and a non-volatile storage device 806. Computing system 800 may optionally include a display subsystem 808, input subsystem 810, communication subsystem 812, and/or other components not shown in FIG. 8.

The processing circuitry 802 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 802 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 802.

Non-volatile storage device 806 includes one or more physical devices configured to hold instructions executable by the processing circuitry to implement the methods and processes described herein. When such methods and processes are implemented, the state of non-volatile storage device 806 may be transformed—e.g., to hold different data.

Non-volatile storage device 806 may include physical devices that are removable and/or built in. Non-volatile storage device 806 may include optical memory, semiconductor memory, and/or magnetic memory, or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by processing circuitry 802 to temporarily store information during processing of software instructions. It will be appreciated that volatile memory 804 typically does not continue to store instructions when power is cut to the volatile memory 804.

Aspects of processing circuitry 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 800 typically implemented in software by a processor to perform a particular function using portions of volatile memory, which function involves transformative processing that specially configures the processor to perform the function. Thus, a program may be instantiated via processing circuitry 802 executing instructions held by non-volatile storage device 806, using portions of volatile memory 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 808 may be used to present a visual representation of data held by non-volatile storage device 806. The visual representation may take the form of a GUI. As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with processing circuitry 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, camera, or microphone.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 800 to send and/or receive messages to and/or from other devices via a network such as the Internet.

Further, the disclosure comprises configurations according to the following clauses.

Clause 1. At a computing device, a method for providing an automated runway incursion alert, the method comprising: receiving, from a location sensor on board an aircraft, location sensor data for the aircraft; receiving location data for target traffic; based on the location sensor data for the aircraft, determining a location, a speed, and a direction of travel for the aircraft; based on the location data for the target traffic, determining a location, a speed, and a direction of travel for the target traffic; determining that the aircraft meets one or more ownship alert criteria; determining that the target traffic meets one or more target traffic alert criteria; and based upon determining that the aircraft meets the one or more ownship alert criteria and the target traffic meets the one or more target traffic alert criteria, outputting a runway incursion alert.

Clause 2. The method of clause 1, wherein receiving the location sensor data for the aircraft comprises receiving one or more of GPS data from a GPS sensor or accelerometer data from an accelerometer on board the aircraft.

Clause 3. The method of clause 1, wherein receiving the location data for the target traffic comprises receiving ADS-B data from an ADS-B receiver communicatively coupled with the computing device, and using the ADS-B data to determine the location of the target traffic.

Clause 4. The method of clause 1, wherein the target traffic comprises one or more of another aircraft or a ground vehicle.

Clause 5. The method of clause 1, wherein outputting the runway incursion alert comprises providing one or more of visual, auditory, or haptic feedback to an operator of the aircraft.

Clause 6. The method of clause 1, wherein determining that the aircraft meets the one or more ownship alert criteria comprises determining that the aircraft is at or within a predetermined altitude range.

Clause 7. The method of clause 1, wherein determining that the aircraft meets the one or more ownship alert criteria comprises determining that the aircraft is descending at or within a threshold descent rate.

Clause 8. The method of clause 1, wherein determining that the aircraft meets the one or more ownship alert criteria comprises determining that the aircraft is at or within a threshold heading of a runway direction.

Clause 9. The method of clause 1, wherein determining that the aircraft meets the one or more ownship alert criteria comprises determining that the aircraft is at or within a threshold distance to a runway threshold.

Clause 10. The method of clause 1, wherein determining that the aircraft meets the one or more ownship alert criteria comprises determining that the aircraft does not qualify for more than one runway.

Clause 11. The method of clause 1, wherein determining that the target traffic meets the one or more target traffic alert criteria comprises determining that the target traffic is grounded.

Clause 12. The method of clause 1, wherein determining that the target traffic meets the one or more target traffic alert criteria comprises determining that the target traffic is not diverging from the aircraft.

Clause 13. The method of clause 1, wherein determining that the target traffic meets the one or more target traffic alert criteria comprises determining that the target traffic is located on a runway.

Clause 14. A computing system, comprising: one or more processors configured to, receive, from a location sensor on board an aircraft, location sensor data for the aircraft; receive location data for target traffic; based on the location sensor data for the aircraft, determine a location, a speed, and a direction of travel for the aircraft; based on the location data for the target traffic, determine a location, a speed, and a direction of travel for the target traffic; determine that the aircraft meets one or more ownship alert criteria; determine that the target traffic meets one or more target traffic alert criteria; and based upon determining that the aircraft meets the one or more ownship alert criteria and the target traffic meets the one or more target traffic alert criteria, output a runway incursion alert.

Clause 15. The computing system of clause 14, wherein the location sensor data comprises one or more of GPS data from a GPS sensor or accelerometer data from an accelerometer on board the aircraft.

Clause 16. The computing system of clause 14, wherein the location data for the target traffic comprises ADS-B data from an ADS-B receiver communicatively coupled with the computing system, and wherein the one or more processors are further configured to use the ADS-B data to determine the location of the target traffic.

Clause 17. The computing system of clause 14, wherein the one or more ownship alert criteria include a predetermined altitude range for the aircraft.

Clause 18. The computing system of clause 14, wherein the one or more ownship alert criteria include a threshold descent rate for the aircraft.

Clause 19. The computing system of clause 14, wherein the one or more ownship alert criteria include a threshold distance from the aircraft to a runway threshold.

Clause 20. A computing system, comprising: a GPS sensor on board an aircraft, the GPS sensor configured to output GPS sensor data; a location data receiver configured to receive location data for target traffic; and one or more processors configured to, receive the GPS sensor data from the GPS sensor; based on the GPS sensor data for the aircraft, determine a position, a speed, and a direction of travel for the aircraft; use the location data for the target traffic to determine a location, a speed, and a direction of travel for the target traffic; determine that the aircraft meets one or more ownship alert criteria; determine that the target traffic meets one or more target traffic alert criteria; and based upon determining that the aircraft meets the one or more ownship alert criteria and the target traffic meets the one or more target traffic alert criteria, output a runway incursion alert.

"And/or" as used herein is defined as the inclusive or V, as specified by the following truth table:

| A | B | $A \vee B$ |
|---|---|---|
| True | True | True |
| True | False | True |
| False | True | True |
| False | False | False |

The terminology "one or more of A or B" as used herein comprises A, B, or a combination of A and B. The terminology "one or more of A, B, or C" is equivalent to A, B, and/or C. As such, "one or more of A, B, or C" as used herein comprises A individually, B individually, C individually, a combination of A and B, a combination of A and C, a combination of B and C, or a combination of A, B and C.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for providing an automated runway incursion alert, the method comprising:

receiving, from a location sensor on board an aircraft, location sensor data for the aircraft;

receiving location data for target traffic, wherein receiving the location data for the target traffic comprises receiving automatic dependent surveillance-broadcast (ADS-B) data received from an ADS-B receiver communicatively coupled with the computing device, and using the ADS-B data to determine the location of the target traffic;

based on the location sensor data for the aircraft, determining a location, a speed, and a direction of travel for the aircraft;

based on the location data for the target traffic, determining a location, a speed, and a direction of travel for the target traffic;

determining that the aircraft meets one or more ownship alert criteria;

determining that the target traffic meets one or more target traffic alert criteria;

determining whether a distance between a centerline of each runway of parallel runways is less than a threshold distance;

based upon determining that the aircraft meets the one or more ownship alert criteria, the target traffic meets the one or more target traffic alert criteria, and the distance between the centerline of each runway of the parallel runways is not less than the threshold distance, outputting a runway incursion alert; and inhibiting output of the runway incursion alert when the distance between the centerline of each runway of the parallel runways is less than the threshold distance.

2. The method of claim 1, wherein receiving the location sensor data for the aircraft comprises receiving one or more of GPS data from a GPS sensor or accelerometer data from an accelerometer on board the aircraft.

3. The method of claim 1, wherein the target traffic comprises one or more of another aircraft or a ground vehicle.

4. The method of claim 1, wherein outputting the runway incursion alert comprises providing one or more of visual, auditory, or haptic feedback to an operator of the aircraft.

5. The method of claim 1, wherein determining that the aircraft meets the one or more ownship alert criteria comprises determining that the aircraft is at or within a predetermined altitude range.

6. The method of claim 1, wherein determining that the aircraft meets the one or more ownship alert criteria comprises determining that the aircraft is descending at or within a threshold descent rate.

7. The method of claim 1, wherein determining that the aircraft meets the one or more ownship alert criteria comprises determining that the aircraft is at or within a threshold heading of a runway direction.

8. The method of claim 1, wherein determining that the aircraft meets the one or more ownship alert criteria comprises determining that the aircraft is at or within a threshold distance to a runway threshold.

9. The method of claim 1, wherein determining that the aircraft meets the one or more ownship alert criteria comprises determining that the aircraft does not qualify for more than one runway.

10. The method of claim 1, wherein determining that the target traffic meets the one or more target traffic alert criteria comprises determining that the target traffic is grounded.

11. The method of claim 1, wherein determining that the target traffic meets the one or more target traffic alert criteria comprises determining that the target traffic is not diverging from the aircraft.

12. The method of claim 1, wherein determining that the target traffic meets the one or more target traffic alert criteria comprises determining that the target traffic is located on a runway.

13. The method of claim 1, wherein determining that the aircraft meets the one or more ownship alert criteria comprises determining that the aircraft is within a final approach envelope extending from a runway threshold.

14. A computing system, comprising:

one or more processors configured to, receive, from a location sensor on board an aircraft, location sensor data for the aircraft;

receive location data for target traffic, wherein the location data for the target traffic comprises automatic dependent surveillance-broadcast (ADS-B) data received from an ADS-B receiver communicatively coupled with the computing system, and wherein the one or more processors are further configured to use the ADS-B data to determine the location of the target traffic;

based on the location sensor data for the aircraft, determine a location, a speed, and a direction of travel for the aircraft;

based on the location data for the target traffic, determine a location, a speed, and a direction of travel for the target traffic;

determine that the aircraft meets one or more ownship alert criteria;

determine that the target traffic meets one or more target traffic alert criteria;

determine whether a distance between a centerline of each runway of parallel runways is less than a threshold distance;

based upon determining that the aircraft meets the one or more ownship alert criteria, the target traffic meets the one or more target traffic alert criteria and the distance between the centerline of each runway of the parallel runways is not less than the threshold distance, output a runway incursion alert; and inhibit output of the runway incursion alert when the distance between the centerline of each runway of the parallel runways is less than the threshold distance.

15. The computing system of claim 14, wherein the location sensor data comprises one or more of GPS data from a GPS sensor or accelerometer data from an accelerometer on board the aircraft.

16. The computing system of claim 14, wherein the one or more ownship alert criteria include a predetermined altitude range for the aircraft.

17. The computing system of claim 14, wherein the one or more ownship alert criteria include a threshold descent rate for the aircraft.

18. The computing system of claim 14, wherein the one or more ownship alert criteria include a threshold distance from the aircraft to a runway threshold.

19. The computing system of claim 14, wherein the one or more ownship alert criteria include a final approach envelope extending from a runway threshold.

20. A computing system, comprising:

a GPS sensor on board an aircraft, the GPS sensor configured to output GPS sensor data;

a location data receiver configured to receive location data for target traffic wherein the location data for the target traffic comprises automatic dependent surveillance-broadcast (ADS-B) data received from an ADS-B receiver communicatively coupled with the computing system; and one or more processors configured to, receive the GPS sensor data from the GPS sensor;

based on the GPS sensor data for the aircraft, determine a position, a speed, and a direction of travel for the aircraft;

use the location data for the target traffic to determine a location, a speed, and a direction of travel for the target traffic;

determine that the aircraft meets one or more ownship alert criteria;

determine that the target traffic meets one or more target traffic alert criteria;

determine whether a distance between a centerline of each runway of parallel runways is less than a threshold distance;

based upon determining that the aircraft meets the one or more ownship alert criteria, the target traffic meets the one or more target traffic alert criteria, and the distance between the centerline of each runway of the parallel runways is not less than the threshold distance, output a runway incursion alert; and inhibit output of the runway incursion alert when the distance between the centerline of each runway of the parallel runways is less than the threshold distance.

* * * * *